Figure 1:
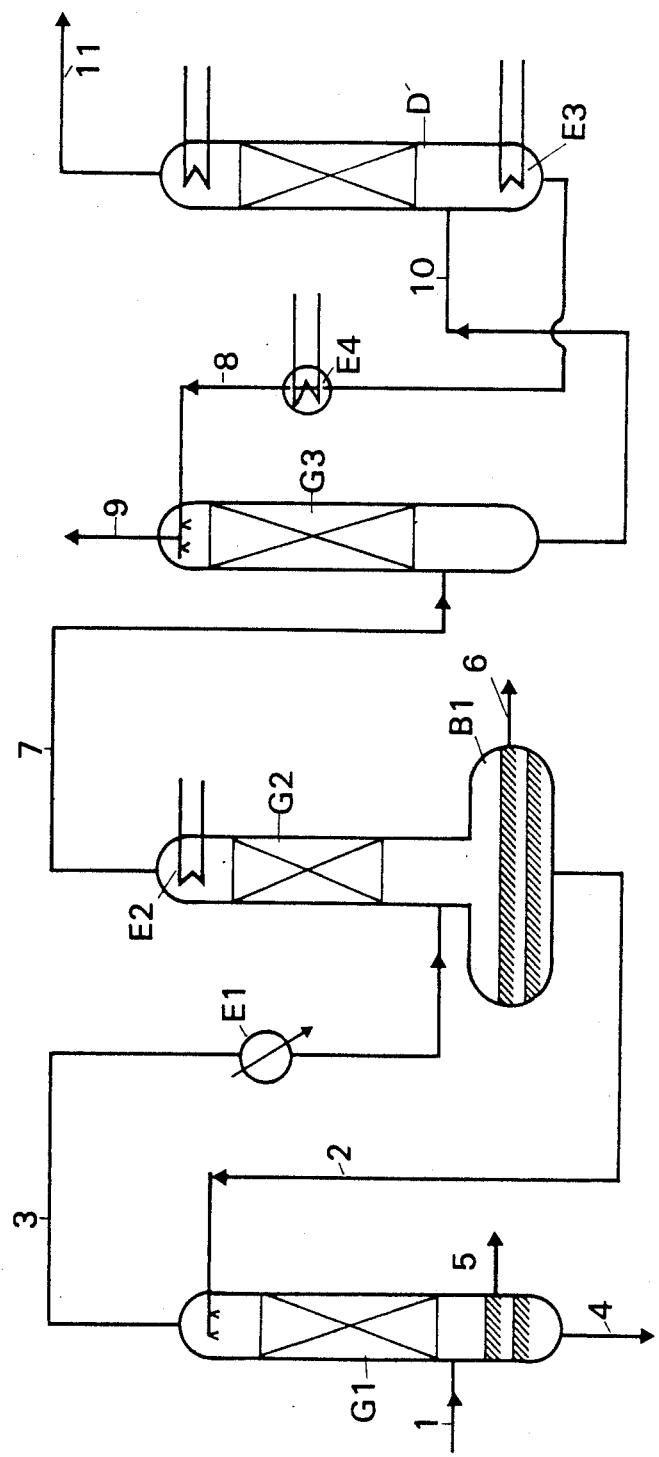

United States Patent [19]

Rojey et al.

[11] Patent Number: 4,979,966
[45] Date of Patent: Dec. 25, 1990

[54] PROCESS AND APPARATUS FOR THE DEHYDRATION, DEACIDIFICATION, AND SEPARATION OF A CONDENSATE FROM A NATURAL GAS

[75] Inventors: Alexandre Rojey, Garches; Annick Pucci, Croissy Sur Seine; Joseph Larue, Chambroucy, all of France

[73] Assignee: Institut Francais du Petrole, Rueil Malmaison, France

[21] Appl. No.: 411,964

[22] Filed: Sep. 25, 1989

[30] Foreign Application Priority Data

Sep. 26, 1988 [FR] France .............................. 88 12642

[51] Int. Cl.$^5$ ........................................ B01D 53/14
[52] U.S. Cl. ............................... 55/32; 55/48; 55/51; 55/73; 55/223

[58] Field of Search ............... 55/54, 48, 51, 68, 73, 55/223, 227, 229

[56] References Cited

U.S. PATENT DOCUMENTS

| | | | |
|---|---|---|---|
| 3,824,766 | 7/1974 | Valentine et al. | 55/48 |
| 3,877,893 | 4/1975 | Sweny et al. | 55/48 |
| 4,529,413 | 7/1985 | Ferguson | 55/32 |
| 4,710,211 | 12/1987 | Gazzi et al. | 55/73 X |

*Primary Examiner*—Charles Hart
*Attorney, Agent, or Firm*—Millen, White & Zelano

[57] ABSTRACT

The invention relates to a process and apparatus for the treatment of a gas containing methane, water, at least one hydrocarbon other than methane, as well as at least one acid gas.

18 Claims, 7 Drawing Sheets

PROCESS AND APPARATUS FOR THE DEHYDRATION, DEACIDIFICATION, AND SEPARATION OF A CONDENSATE FROM A NATURAL GAS

The present invention is directed at carrying out the different stages of the treatment of a natural gas: dehydration, separation of the condensable hydrocarbons (e.g. those containing at least two or at least three carbon atoms or more) and deacidification, in the same integrated process.

French Pat. application No. 2605 241 describes a treatment process calling on a refrigerated physical solvent and making it possible to perform all the operations of dehydration, separation of higher hydrocarbons and deacidification.

This process has important advantages compared with the prior art procedures. In particular, the separation of the water and the solvent by contact with the treated gas makes it possible to obviate carrying out said separation by distillation.

However, it has certain disadvantages. The separation between the methane and the hydrocarbons, such as propane and hydrocarbons, whose molecules contain more than three carbon atoms is incomplete, whereas it is desirable for said separation to be as complete as possible.

In addition, the stage of absorbing the acid gases leads to an absorption in the solvent, not only of the acid gases, but also a hydrocarbon fraction. These hydrocarbons can occur with the acid gases following the stage of regenerating the solvent, which is unfavorable, on the one hand due to the losses of that thus entrained hydrocarbons and on the other hand, when the hydrogen sulphide is present, as a result of the fact that the presence of hydrocarbons makes it difficult to eliminate the hydrogen sulphide by the Claus reaction.

The process and apparatus according to the invention is aimed at solving these problems. In accordance with the invention:

(a) said gas is contacted with a recycled liquid phase containing both water and a solvent, said solvent being a normally liquid, non-hydrocarbon, organic compound, other than water, said compound being at least partly miscible with water and distillable at a temperature below that of the distillation of water, so as to obtain a solvent depleted, aqueous liquid phase, by comparison with said recycled liquid phase, and a solvent-containing gaseous phase;

(b) the gaseous phase from stage (a) is cooled, so as to partly condense it, the condensate obtained containing an aqueous phase and a hydrocarbon phase and the condensate is separated from the non-condensed gas;

(c) the non-condensed gas is rectified by making it circulate in a rising direction and by cooling it in order to bring about its partial condensation, by making the resulting condensed liquid flow in a downward direction in countercurrent contact with the rising gas and by collecting after said contact a non-condensed gaseous phase and a mixture of said condensed liquid with the condensate of stage (b), said mixture incorporating an aqueous liquid phase and a liquid hydrocarbon phase;

(d) the aqueous liquid phase is separated by decanting from the liquid hydrocarbon phase obtained in stage (c), the hydrocarbon phase is drawn off and the aqueous phase recycled to stage (a);

(e) the non-condensed gaseous phase from stage (c) is contacted with a regenerated solvent phase from stage (f), so as to dissolve in said solvent phase at least part of the acid has present in said non-condensed gaseous phase and a deacidified gaseous phase and an acid gas-containing solvent phase are collected;

(f) by expansion and/or heating at least part of the acid gas is freed from the solvent phase collected in stage (e) and the resultant regenerated solvent phase is returned to stage (e).

The term "normally liquid" compound is understood to mean "liquid under normal temperature and pressure conditions".

FIGS. 1 to 9 illustrate various embodiments of the invention.

The natural gas to be treated, which contains methane, water, acid gases and at least one condensable hydrocarbon arrives by pipe 1 (FIG. 1). It is contacted in contact zone G1 with a solvent - water mixture from pipe 2. A solvent-containing gaseous phase is discharged by pipe 3 at the top. A substantially solvent-free aqueous phase is drawn off by pipe 4 at the bottom. If a hydrocarbon phase has condensed, it is separated by decanting and discharged by pipe 5. The top gaseous phase is partly cooled in exchanger E1, so as to bring about a partial condensation. The resultant gaseous phase is brought into rising contact in contact zone G2 with the falling condensate formed on contact with the cooling or refrigerating cricuit E2 located above G2. Two phases separate in the decanter B1. These phases result from condensations performed in E1 and E2 and from the contact in G2. The hydrocarbon phase essentially formed by condensable hydrocarbons of the natural gas (C3+or possibly C2+) is discharged by line 6. The aqueous phase essentially formed by water and solvent is returned by line 2 to the contact zone G1. The gas, which is largely free from condensable hydrocarbons, but which still contains a significant proportion of acid gases, is supplied by line 7 to the conduct zone G3, where in countercurrent manner it encounters a regenerated solvent phase arriving by line 8 and cooled in exchanger E4 by an external refrigerating or cooling fluid. The treated gas, largely free from acid gases, is discharged by line 9. The solvent phase is supplied by line 10 to the distillation or stripping zone D1. In order to assist the vaporization of the acid gases discharged by line 11, the solvent phase undergoes heating or expansion in zone D1 (where in this case a heating means E3 is shown). The regenerated solvent is passed through exchanger E4 to contact zone G3 by pipe 8.

Figure 2:
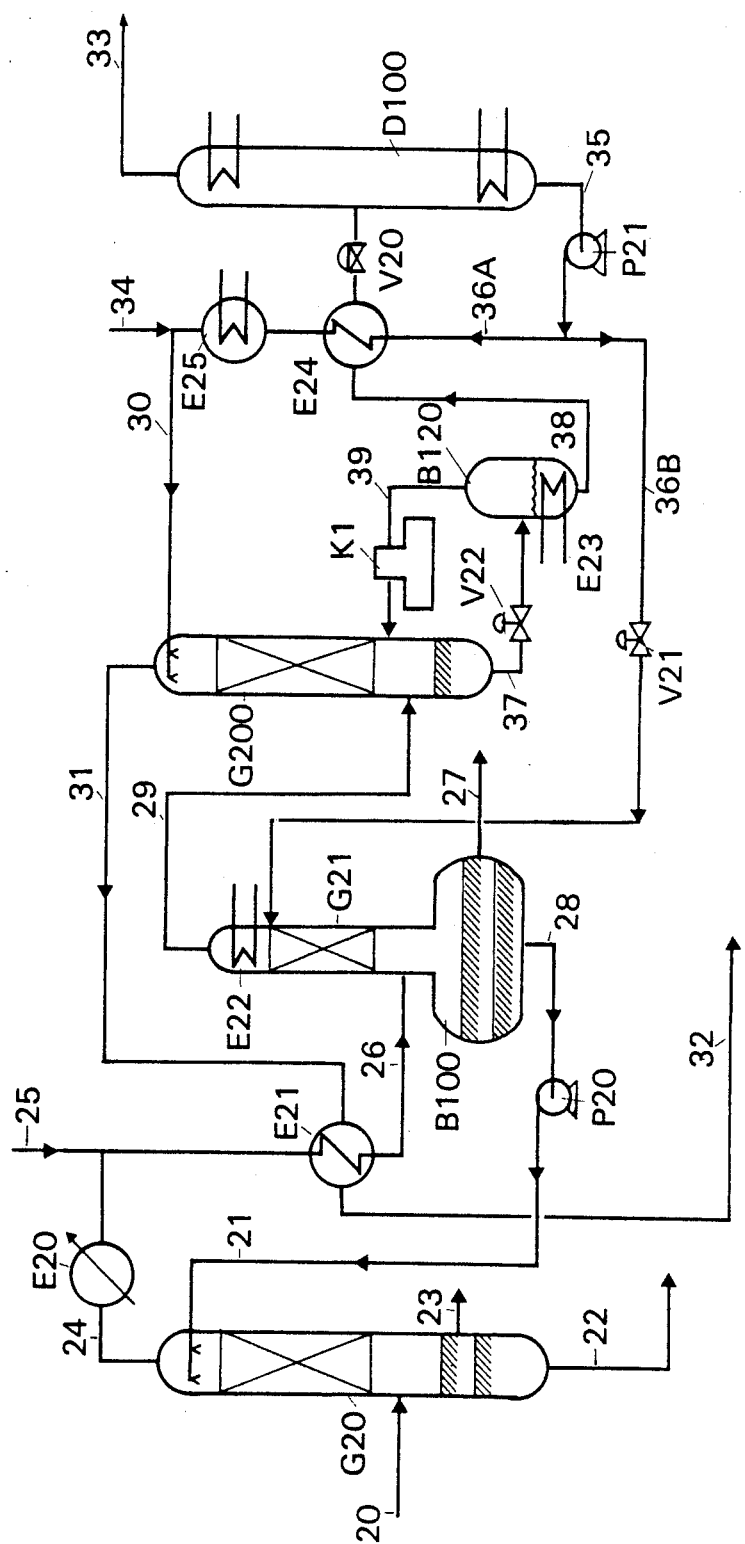

FIG. 2 shows another embodiment. The gas to be treated arrives by pipe 20. It is contacted in contact zone G20 with a solvent-water mixture arriving by pipe 21. On leaving the contact zone G20, pile 22 is used for discharging a substantially solvent-free aqueous phase. If a liquid hydrocarbon phase is present, it is separated by decanting and discharged by pipe 23. A solvent-containing gaseous phase is discharged by pipe 24 at the top of contact zone G20. This gaseous phase is cooled in exchanger 20 by an external cooling fluid, namely water or available air. If necessary it can then be mixed with a solvent top-up arriving through pipe 25, in order to compensate possible losses. The resulting mixture is further cooled in exchanger E21, which it leaves by pipe 26. It is then contacted in contact zone G21 with a mixture of two liquid phases, whereof one is essentially formed by hydrocarbons and the other is an aqueous phase. The origin of these phases is explained hereinafter. The gaseous phase leaving the contact zone G21 is again cooled in cooling zone E22 with the aid of an external coolant. This cooling produces the formation of two liquid phases, one being essentially formed by hydrocarbons, whilst the other is an aqueous phase and they are supplied to the contact zone G21. The contact operation performed in contact zone G21 makes it possible to reduce the quantity of propane and hydrocarbons, whose molecules have more than three carbon atoms in the gas leaving the contact zone G21 and to reduce the methane quantity in the liquid phase essentially formed by hydrocarbons. It also makes it possible to entrain in the gas part of the solvent contained in the aqueous phase and in the hydrocarbon phase.

The two liquid phases leaving contact zone G21 are separated by decanting in decanter B100. The hydrocarbon phase is discharged by pipe 27. The aqueous phase essentially formed by a mixture of water and solvent is discharged by pipe 28. It is then taken up by pump P20 and recycled by pipe 21 to contact zone G20. The solvent top-up flow arriving through pipe 25 is regulated in such a way as to obtain a solvent concentration in the aqueous phase, which is so fixed that any risk of hydrate formation is avoided. The solvent concentration in said aqueous phase is preferably between 20 and 60%.

The contact operation between the gas and the two liquid phases obtained by cooling or refrigeration, thus makes it possible to improve the separation between the methane and the hydrocarbons, such as propane and hydrocarbons, whose molecules have more than three carbon atoms. The gaseous phase obtained after cooling in cooling zone E22 and the separation of the liquid phases supplied to contact zone G21 is fed by pipe 29 to contact zone G200.

In contact zone G200, the gaseous phase arriving by pipe 29 is contacted with a solvent phase arriving by pipe 30. This solvent phase contains a water concentration preferably between 5 and 50%. The presence of water in the solvent phase makes it possible to limit the absorption of hydrocarbons and thus reduce the quantity of hydrocarbons present with the acid gases on leaving the solvent regeneration stage.

The treated gas from which at least part of the acid gases has been removed is discharged by pipe 31 and passes into exchanger E21, where it is heated whilst cooling the gas which is supplied to the contact zone G21. It passes out of the exchanger E21 through pipe 32 and is discharged.

The solvent phase discharged from contact zone G200 by pipe 37 is expanded in valve V22 and heated in flask B120 by the heat exchanger E23. The gas formed is discharged by pipe 39, recompressed by compressor K1 and returned to the contact zone G200. The liquid is discharged by pipe 38, reheated in that exchanger E24, expanded invalve V20 and fed into the distillation zone D100. The regenerated solvent phase is discharged by pipe 35, taken up by pump P21 and fed by pipe 36A into the heat exchanger E24, where it is cooled by heat exchange with the liquid from flask B120.

The solvent phase leaving exchanger E24 is cooled by an external coolant in exchanger E25 and is recycled by pipe 30 to contact zone G200.

The deacidification stage (e) is performed at a mean temperature preferably at the most equal to the mean temperature of stage (c), so as to benefit from an increase solvent power and selectivity of the solvent phase, but preferably close thereto, the variation between the mean temperature of stage (e) and the mean temperature of stage (c) preferably being at the most equal to 20° C.

The acid gases leaving distillation zone D100 are discharged by pipe 33.

As the water content of the solvent phase arriving by pipe 30 is normally below the water content of the solvent phase in equilibrium with the gas arriving by pipe 29 in contact zone G200, the solvent content of the gas leaving contact zone G200 by pipe 31 is normally above the solvent content of the gas entering the contact zone G200 by pipe 29. This solvent loss can be compensated by a top-up solvent flow arriving by pipe 34 and regulated so as to maintain fixed the composition of the solvent phase supplied to contact zone G200

In the same way, the water content of the gas leaving contact zone G200 by pipe 31 is normally below the water content of the gas entering contact zone G200 by pipe 29. In order to avoid an accumulation of water in the circulation circuit of the solvent phase supplied to contact zone G200, pipe 36B is used for discharging a purge flow, which can be returned to the upper part of contact zone G21. This purge flow is controlled by valve V21 which is regulated so as to maintain substantially constant the solvent and water quantities present in the circulation circuit of the solvent phase supplied to contact zone G200, e.g. by controlling a distillation level in distillation zone D100.

The solvent used must be at least partly miscible with the water. Preferably, it must have a boiling point below that of water, or form with the water and azeotrope, whose boiling point is below that of water, so as to be entrainable by the gas during stage (a) of the process.

This solvent can e.g. be methanol. However, it can also be chosen e.g. from the following solvents: methyl propyl ether, ethyl propyl ether, dipropyl ether, methyl tert butyl ether, dimethoxy methane. dimethoxy ethane, ethanol, methoxy ethanol and propanol.

The liquid phase essentially formed by hydrocarbons collected in decanter B100 contains the solvent. In order to at least partly eliminate the solvent which it contains, it is possible to contact it with a solvent-free aqueous phase by removing a fraction of the aqueous phase discharged by PiPe 22.

Figure 3:
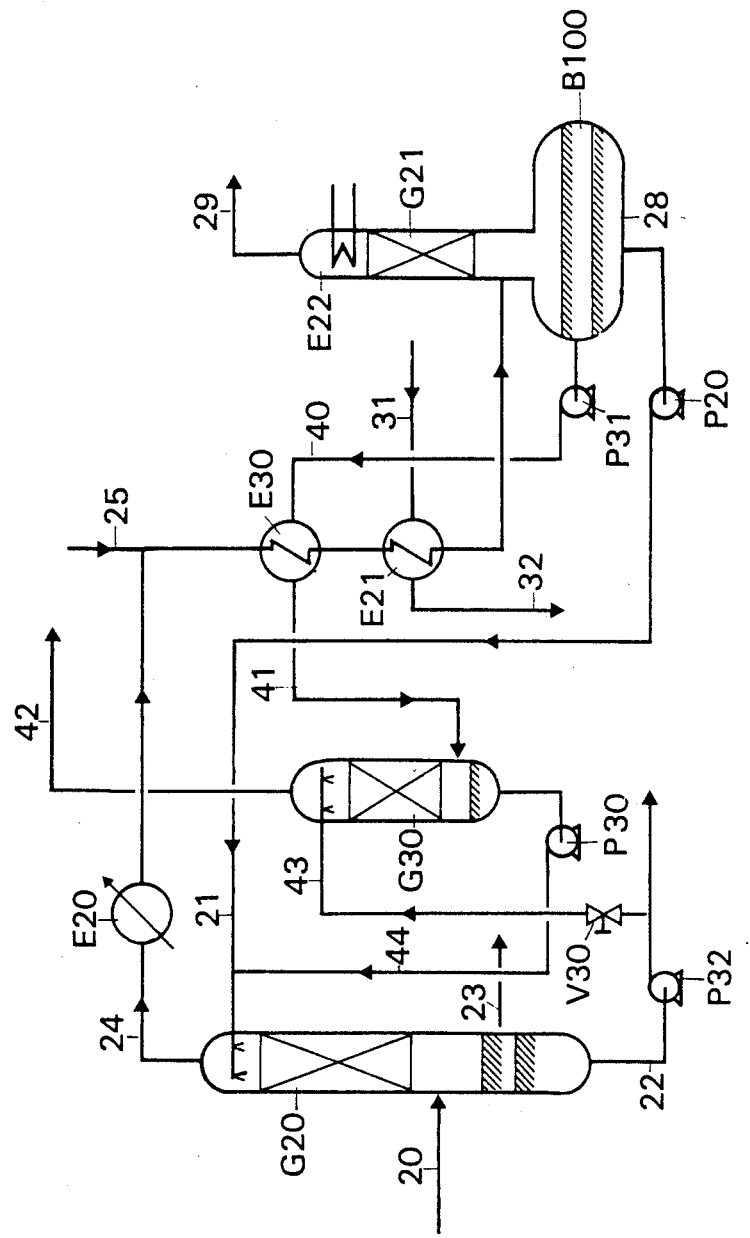

It is e.g. possible to operate according to the diagram shown in FIG. 3. In connection with the latter, the means which are the same as those shown in FIG. 2 are designated by the same references.

The hydrocarbon phase collected in decanter B100 is removed by pump P31 and supplied by pipe 40 to exchanger E30, where it is heated by heat exchange with the treated gas. It is then supplied by pipe 41 to contact zone G30. The aqueous phase discharged at the outlet from contact zone G23 by pipe 22 is taken up by pump P32 and a fraction of said aqueous phase, whose flow is controlled by valve V30, is supplied by pipe 43 to contact zone G30.

The hydrocarbon phase, from which most of the solvent which it contained on entering the contact zone G30 has been removed, is discharged by pipe 42. The aqueous phase containing solvent leaving contact zone G30 is discharged by pump P30 and supplied by pipe 44 mixing with the aqueous phase arriving by pipe 21.

The hydrocarbon phase collected in decanter B100 contains solvent, as well as methane and ethane. In order to remove at least part of the solvent, together with the methane and ethane contained therein. It is possible to contact it with the treated gas from stage (a) in accordance with the diagram of FIG. 4. The hydrocarbon phase is supplied by pipe 50 to a contact zone G22, where it is contacted with the treated gas from stage (a).

The entrainment by the treated gas of light hydrocarbons contained in the liquid phase arriving by pipe 50 leads to a cooling of the treated gas. The risk of hydrate formation is obviated through the presence of the solvent in the gas entering contact zone G22. The gaseous phase leading contact zone 22 is discharged by pipe 51, which joins line 24 and exchanger E20. The liquid phase leaving the contact zone G22 loses part of the methane and ethane which it contained, but still contains solvent. It can then be discharged or, as indicated in FIG. 4, supplied at the same time as the aqueous phase arriving by pipe 21 to the contact zone G20.

In contact zone G20, the treated gas is then contacted with two liquid phases. An aqueous phase from stage (d) arriving by pipe 21 and a hydrocarbon phase from contact zone G22. Contact with the treated gas arriving by pipe 20 makes it possible to eliminate most of the solvent contained in each of these liquid phases. On leaving the contact zone G20, the aqueous phase and hydrocarbon phase from which most of the solvent has been removed are separated by decanting. The aqueous phase is discharged by pipe 22 and the hydrocarbon phase by pipe 23.

In certain cases, it is possible to eliminate contact zone G22 by making the liquid phase discharged at the outlet of contact zone C21 arrive through pipe 50 directly at the top of contact zone G20, where it is contacted with the treated gas at the same time as the aqueous phase arriving by pipe 21.

Figure 4:
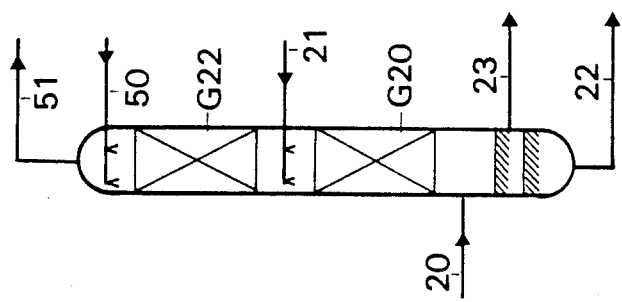
Figure 6:
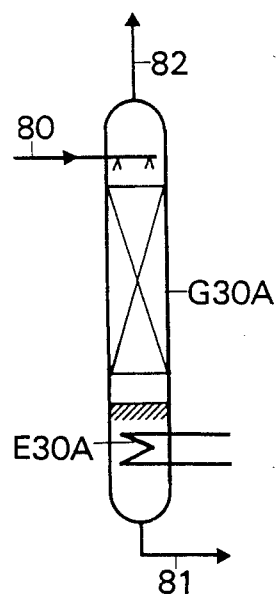
Figure 7:
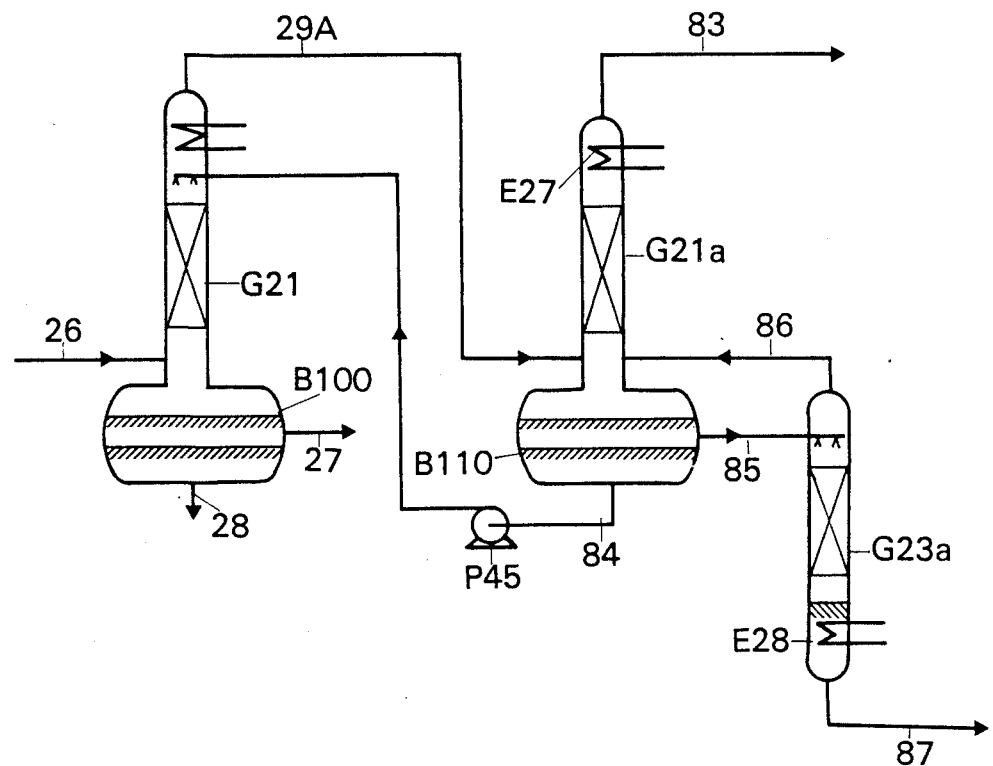
Figure 8:
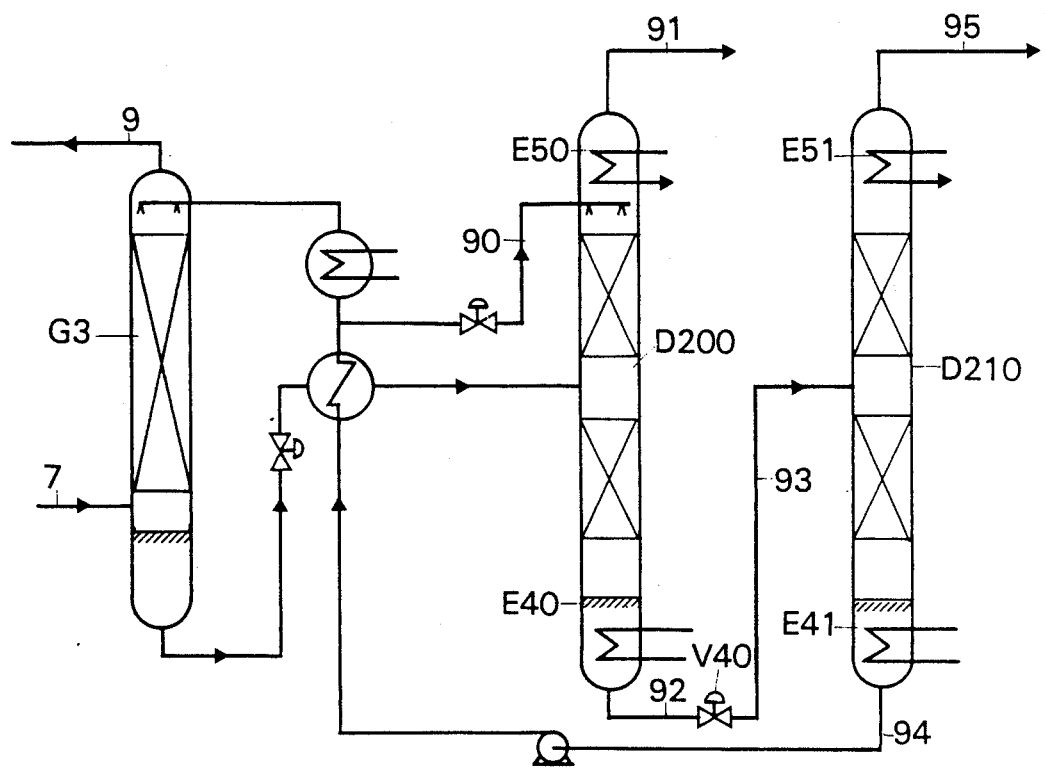

Such a solution which has the advantage of being simpler than that illustrated in FIG. 4, suffers from the disadvantage of increasing the risk of hydrates forming, due to the fact that the cooling of the treated gas as a result of the entrainment of light hydrocarbons occurs at the same time as the solvent transfer from the liquid phase to the gaseous phase.

It is also possible to carry out the contact between the aqueous phase and a fraction of the gas to be treated in a contact zone separate from the contact zone in which contact takes place between the hydrocarbon phase and a fraction of the gas to be treated. In this case, it is e.g. possible to operate according to the diagram of FIG. 5.

The aqueous phase from stage (d) arrives through pipe 21. It is contacted in contact zone G23 with a fraction of gas to be treated arriving by pipe 60. Pipe 66 is used for discharging the aqueous phase from which most of the solvent which it contained on entering the contact zone G23 has been removed, whilst pipe 63 discharges the solvent-containing gas.

The liquid hydrocarbon phase from decanter B100 arrives by pipe 64 It is contacted in contact zone G25 with the gaseous fraction arriving by pipe 63 mixed with the gaseous fraction from contact zone G24 and arriving by pipe 68.

The entrainment of light hydrocarbons by the treated gas causes a cooling, but this cooling does not risk leading to the formation of hydrates, because the gas arriving by pipe 63 contains solvent. This cooling leads to the condensation of a solvent-containing aqueous phase. On leaving the contact zone G25, the two liquid phases are separated by decanting. The aqueous phase is drawn off by pump P40 and supplied by pipe 71 for mixing with the aqueous phase from stage (d) and arriving by pipe 21. The resulting mixture is supplied by pipe 62 to contact zone G23.

The hydrocarbon phase removed at the outlet from contact zone G25 is supplied by pipe 69 to contact zone G24, where it is contacted with a second gas fraction to be treated arriving by pipe 61. pipe 67 is used for discharging a hydrocarbon phase from which most of the solvent which it contained on entering contact zone C24 has been removed, whilst pipe 68 removes a solvent-containing gas.

Contact between the gas arriving by pipe 61 and the liquid hydrocarbon phase arriving by pipe 69 can bring about a cooling by vaporization of light hydrocarbons contained in the liquid hydrocarbon phase. Such a cooling leads to the condensation of an aqueous phase which, in this case, is separated by decanting at the outlet from contact zone G24 and is discharged.

The liquid hydrocarbon phase leaving contact zone G25 can also be freed from most of the solvent phase which it contains by contact with part of the aqueous phase discharged at the outlet of contact zone G20 by operating in accordance with the arrangement illustrated in FIG. 3.

The liquid hydrocarbon phase discharged by pipe 23 (FIG. 4) or pipe 67 (FIG. 5) still contains small amounts of methane and ethane. In order to reduce said residual methane and ethane contents, it is possible to contact the liquid hydrocarbon phase with a vapour phase obtained by reboiling and refluxed, e.g. by operating in accordance with the diagram of FIG. 6.

The liquid hydrocarbon phase arriving by pipe 80 (corresponding to pipe 23 or 67) is contacted with a vapour phase in contact zone G30A. The liquid phase leaving contact zone G30A is heated in reboiling zone E3QA, said heating leading to the production of the aforementioned vapour phase, which is supplied in reflux form to contact zone G30A. The liquid hydrocarbon phase leaving reboiling zone G30A is discharged by pipe 81.

Figure 5:
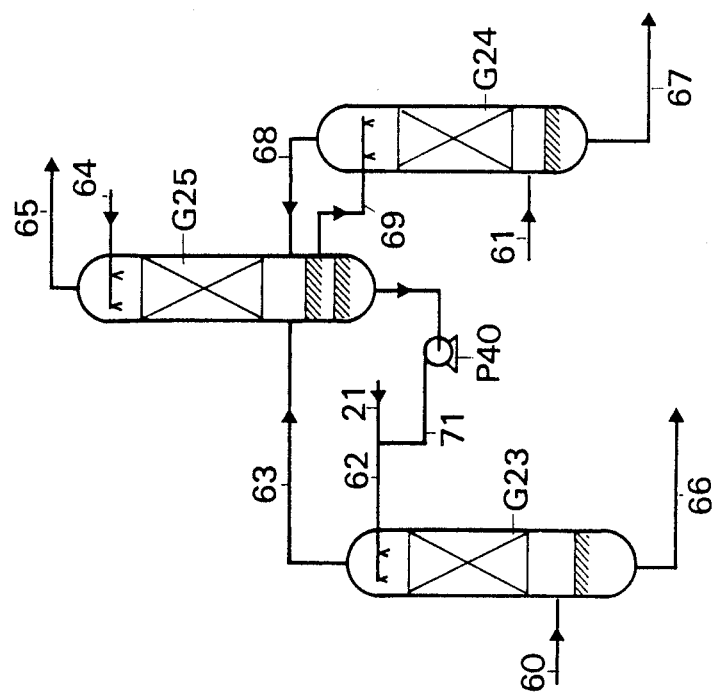

The vapour hydrocarbon phase leaving by pipe 82 is supplied to the intake of contact zone G20 (line 20) in the case of the diagram of FIG. 4 and to the intake of contact zone G24 (line 61) in the case of FIG. 5.

The temperature at the top of the rectification zone (stage c) determines the proportion of hydrocarbons, other than methane, which are condensed. When it is wished to separate all the hydrocarbons formed from molecules, whose carbon atom number is at least equal to 3, i.e. propane and all hydrocarbons with a high molar mass, said temperature can e.g. be between $-20$ and $-50°$ C. for a gas pressure between 0.5 and 10 MPa.

When it is wished to separate all the carbons formed from molecules having a number of carbon atoms at least equal to 2, i.e. ethane and all hydrocarbons with a high molar mass, said temperature can e.g. be between $-40$ and $-100°$ C. for a gas pressure between 0.5 and 10 MPa.

It is also possible to operate in two stages, so as to obtain on the one hand a liquid fractions essentially containing propane and all hydrocarbons with a high molar mass and on the other hand an ethane-rich liquid fraction. In this case, it is e.g. possible to operate according to the diagram of FIG. 7.

The gas leaving the contact zone G21 at a temperature between $-20$ and $-50°$ C. and from which most of the propane which it contains has been removed, is supplied by line 29a to a contact zone G21a in which it is contacted with two liquid phases, namely a hydrocarbon phase and a solvent phase, which are produced by cooling in exchange zone E27. On leaving contact zone G21a, two liquid phases are discharged and separated in decanter B110.

The solvent phase is discharged by pipe 84, taken up by pump P45 and delivered to the top of contact zone G21. The hydrocarbon phase is supplied by pipe S5 to the top of contact zone C23a.

At the bottom of contact zone G23a, a liquid hydrocarbon phase is discharged and heated in reboiling zone E28, so as to produce a vapour phase, which is supplied to contact zone G23a. The vapour phase leaving contact zone G23a is discharged by pipe 86 and supplied to contact zone G21a. An ethane-rich liquid phase is discharged by pipe 87.

The gas leaving exchange zone E27 by pipe 83 has a temperature between $-40$ and $-100°$ C. is freed from most of the ethane contained in the gas entering the process.

In the embodiment of the process shown in FIG. 2, the solvent regeneration stage is carried out, after expansion, in a contact column D100, by heating the base of the column in such a way as to reduce the acid gas concentration in the regenerated solvent phase, which is recycled to stage (e) and by cooling the top of the column so as to reduce the solvent concentration of the eliminated acid gas.

If the treated gas contains both carbon dioxide and hydrogen sulphide, it may be necessary to obtain at the end of the solvent regeneration stage, on the one hand a fraction essentially formed by carbon dioxide and on the other a gaseous fraction mainly formed by hydrogen sulphide. In this case the solvent regeneration stage can be performed e.g. in accordance with the diagram of FIG. 8.

The solvent phase discharged at the outlet from contact zone G3 following a first expansion is supplied to a contact column D200. The solvent phase collected at the bottom of the column is heated in the heat exchange zone E40 producing a gaseous phase containing carbon dioxide, hydrogen sulphide and vaporized solvent. The gaseous phase discharged at the top of the column is cooled in the exchange zone E50, so as to condense most of the solvent. The liquid solvent phase, which again descends into the contact column D200, makes it possible to absorb at least part of the hydrogen sulphide contained in the gas. In order to more completely absorb the hydrogen sulphide contained in the gas, it is possible to supply a solvent top-up to the top of the column through pipe 90. Thus, a gaseous fraction essentially formed by carbon dioxide is discharged through pipe 91.

The solvent phase discharged at the bottom of column D200 by pipe 92 is expanded through relied valve V40 and supplied by pipe 93 to contact column D210. The solvent phase collected at the bottom of the column is heated in heat exchange zone E41 producing a regenerated solvent phase, which is discharged by pipe 94 and recycled to contact zone G3 and a gaseous phase mainly formed by hydrogen sulphide. The gaseous phase discharged at the top of the column is cooled in exchange zone E51, so as to condense most of the solvent. Thus, a gaseous fraction mainly formed by hydrogen sulphide is discharged by pipe 95.

The gas leaving deacidification stage (e) is relatively cold. At least part of the cooling necessary in stage (b) can be obtained by heat exchange between the has from stage (a) and the gas from stage (e). The necessary cooling or refrigeration complement can be supplied by different methods. It can be supplied by a one or two stage compression refrigerator. It can also be obtained by expansion of the treated gas in a turbine.

The necessary cooling complement can be supplied during several heat exchanges and at least part thereof can also be supplied by an absorption refrigerator, or by a refrigerating cycle in which the refrigerating fluid is compressed by means of a gas ejector.

Figure 9:
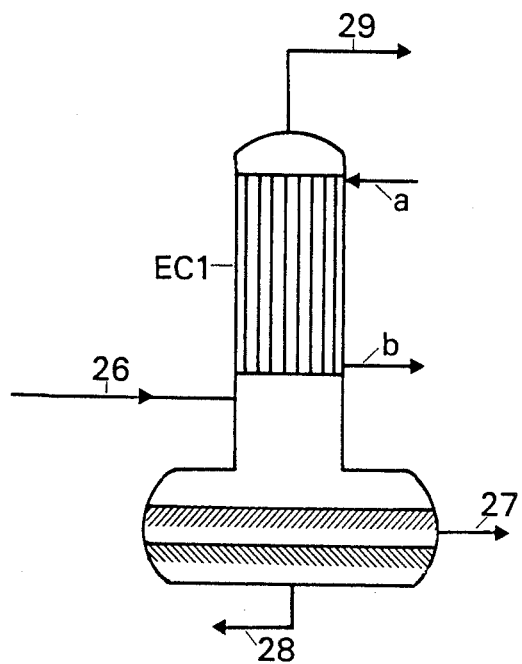

For the rectification performed in contact zone G21, the contact between the two falling liquid phases and the rising vapour phase on the one hand and the cooling (exchanger E22) on the other can be performed in the same apparatus constituted by an exchanger-contactor, as indicated in FIG. 9.

The exchanger-contactor EC1 is constituted by several vertical channels or conduits, in which there can be a liquid and vapour flow, the liquid or liquids flowing downwards and the gas upwards. These conduits are cooled by indirect heat exchange with an external cooling fluid entering the exchanger-contactor EC1 by pipe a and leaving by pipe b. Thus, when the gaseous phase cf the mixture to be rectified entering by pipe 26 flows upwards in the conduits, part condenses on the walls and constitutes a liquid reflux, which descends again. This reflux is formed from two liquid phases, one being essentially constituted by hydrocarbons and the other by an aqueous solvent phase. This simultaneous contacting and cooling offers several advantages. From the compactness standpoint, the integration of two functions into a single apparatus makes it possible to reduce the equipment size. Moreover, separation is much more effective than in the case where the two junctions are separated. For example, in the case of the separation of the constituents of the natural gas, said system permits a recovery of more than 95% of the hydrocarbons containing at least three carbon atoms.

This exchanger-contactor can e.g. be a brazed aluminium platetype exchanger, or a calender tube-type exchanger, in which case the mixture to be separated circulates in the tubes and the cooling fluid in the calender. In all these cases, the exchanger-contacter is designed and positioned in such a way that the circulating conduits for the mixture to be rectified are vertical, so that there can be a gravity flow of the liquid formed along the walls by condensation. Moreover, these conduits can be provided with inner linings which increase the efficiency of separation and the heat transfer.

This procedure of simultaneous contact and heat exchange in an exchanger-contactor can also be performed on the contact zone G21a and exchanger E27 (FIG. 7) and also for performing stages (a) and (b) and-/or (b) and (c).

The process according to the invention can be illustrated by the following example.

EXAMPLE

The diagram of FIG. 2 is used in this example. A water-saturated natural gas enters the process according to the invention by pipe 20. Its temperature is 40° C., its pressure 3 MPa, its flow rate 100 t/h. It contains 38% methane, 29.2% ethane, 17.5% propane, 11% butane, 3.1% $CO_2$ and 1.2% $H_2S$ (percentages by weight).

The gas enters contactor G20, where it is countercurrent contacted with an aqueous methanol solution from pipe 21, whose flow rate is 279 Kg/h and which contains 42% by weight methanol. In contactor G21, the gas becomes charged with methanol, so that the liquid phase separated at the bottom of the contactor and evacuated by pipe 22 contains water with 1% by weight methanol. Its flow rate is 180 Kg/h. The methanol-containing gas passes out of contactor G20 by pipe 24. It is cooled to 5° C. in exchanger E21, which leads to its partial condensation and enters contact zone G21 by pipe 26. It is cooled in exchanger E22 with the aid of an external coolant until its temperature is −50° C. There is a partial condensation and two liquid phases result therefrom, one being essentially constituted by hydrocarbons and the other by a mixture of water and methanol, which flow back towards the lower part of the contact zone G21 in flask B100, where the two liquid phases (including the condensate formed in E21) are separated. The aqueous methanol phase is extracted by pipe 28, pumped by pump P20 and returned by pipe 21 to contact zone G20. The hydrocarbon phase leaves flask B100 by pipe 27 and constitutes one of the products of the process, its flow rate being 44.6 t/h. Compared with the crude gas entering by pipe 20, the liquid hydrocarbon phase leaving by pipe 27 corresponds to 7.5% methane, 41.8% ethane, 99.7% propane and 100% butane.

The stripped gas leaving by pipe 29 enters contact zone G200, where it is countercurrent contacted with an aqueous methanol phase entering by pipe 30. The solvent phase has a flow rate of 49.6 t/h with a 64% methanol concentration, its temperature being −50° C. At the top of contact zone G200, the gas passes out through pipe 31. Its flow rate is 53.3 t/h and its $H_2S$ content 3 ppm. The liquid phase leaving by pipe 37 is expanded to a pressure of 1 MPa in valve V22, so as to demethanize the solvent phase. The gas and liquid are separated in flask B120. The gas formed constituted mainly by methane leaves flask B120 by pipe 39 and is returned by compressor K1 to contact zone G200. The liquid phase leaves flask B120 by pipe 38, is heated in exchanger E24 and enters the solvent cooling zone D100 following expansion by valve V20. In said zone, the solvent phase is rectified. The head of the zone D100 is cooled to 0° C., whilst the bottom is heated to 140° C. The gas leaving at the top by pipe 33 has a flow rate of 1.9 t/h and by weight contains 35.8% $H_2S$ and 34.4% $CO_2$. The regenerated solvent phase leaves zone D100 by pipe 35 and is supplied by pump P21 and pipe 32 to exchanger E24, where it is precooled by exchange with the solvent phase leaving flask B120 and then again cooled in exchanger E25 by an external cooling fluid to a temperature of −50° C. It enters contact zone G200 by pipe 30. As a result of the methanol losses caused by vapour phase entrainment in pipe 33, it is necessary for pipe 34 to introduce an additional 5 Kg/h of methanol.

We claim:

1. A process for the treatment of a gas containing methane, water, at least one hydrocarbon other than methane and at least one acid gas with a view to at least partly removing the water, hydrocarbons other than methane and acid gas, said process comprising the steps of:
    (a) contacting said gas with a recycled liquid phase containing both water and a solvent, said solvent being a normally liquid, non-hydrocarbon, organic compound, other than water, said organic compound being at least partly miscible with water and distillable at a temperature below the distillation temperature of water, so as to obtain a solvent-depleted, aqueous liquid phase, by comparison with said recycled liquid phase, and a solvent-containing gaseous phase;
    (b) cooling said gaseous phase from stage (a), so as to partly condense it, the resultant condensate containing an aqueous phase and a hydrocarbon phase, and separating said condensate from non-condensed gas;
    (c) rectifying said non-condensed gas by making it circulate in a rising direction and by cooling it in order to bring about its partial condensation, flowing resultant condensed liquid in a downward direction in countercurrent contact with rising gas and by collecting, after said countercurrent contact, a non-condensed gaseous phase and a mixture of said condensed liquid with said condensate of stage (b), said mixture incorporating an aqueous liquid phase and a liquid hydrocarbon phase;
    (d) separating said aqueous liquid phase from said liquid hydrocarbon phase obtained in stage (c) by decanting, the liquid hydrocarbon phase being drawn off and the aqueous liquid phase being recycled to stage (a);
    (e) contacting said non-condensed gaseous phase from stage (c) with a regenerated solvent phase from stage (f), so as to dissolve in said solvent phase at least part of the acid gas present in said non-condensed gaseous phase, and collecting a deacidified gaseous phase and an acid gas-containing solvent phase;
    (f) freeing at least part of the acid gas from the solvent phase collected in stage (e) by expansion and/or heating and returning resultant regenerated solvent phase to stage (e).

2. A process according to claim 1, wherein said liquid hydrocarbon phase from stage (d) is contacted with said gaseous phase from stage (a), so as to at least partly remove therefrom the methane and ethane contained therein.

3. A process according to claim 1, wherein said liquid hydrocarbon phase from stage (d) is contacted with the gas treated during stage (a), so as to obtain a liquid hydrocarbon phase from which at least part of the solvent contained therein is removed.

4. A process according to claim 1, wherein said liquid hydrocarbon phase from stage (d) is supplied to a reboiling zone, where it is contacted with a vapor phase under reflux conditions obtained by heating and partial vaporization of the liquid hydrocarbon phase discharged from the reboiling zone and said vapor phase from the reboiling zone is remixed with the gas treated in stage (c).

5. A process according to claim 1, wherein said liquid hydrocarbon phase from stage (d) is contacted with an aqueous phase from stage (a), so as to obtain a liquid hydrocarbon phase from which has been removed at least part of the solvent which it contained and a solvent-containing aqueous phase and said solvent-containing aqueous phase is recycled to the intake of stage (a).

6. A process according to claim 1, wherein said liquid phase recycled to stage (a) contains 20 to 60% by weight of solvent.

7. Process according to claim 1, characterized in that the solvent phase supplied to stage (e) contains 5 to 50% by weight of water.

8. A process according to claim 1, wherein, on leaving the regeneration stage (f), a purge flow is removed from said regenerated solvent phase, so as to maintain substantially constant the solvent and water quantities present in the complete circuit.

9. A processing according to claim 1, wherein said solvent is methanol.

10. A process according to claim 1, wherein said solvent is chosen from methyl propyl ether, ethyl propyl ether, dipropyl ether, methyl tert butyl ether, dimethoxy methane, dimethoxy ethane, ethanol, methoxy ethanol and propanol.

11. A process according to claim 1, wherein the temperature of the gaseous phase on leaving stage (c) is between $-20$ and $-50°$ C., the gas obtained on leaving stage (c) being freed from most of the propane which it contained on entering the process.

12. A process according to claim 1, wherein the temperature of the gaseous phase on leaving stage (c) is between $-40$ and $-100°$ C., the gas obtained at the end of stage (c) being freed from most of the ethane which it contained on entering the process.

13. A process according to claim 1, wherein stage (e) is performed at a mean temperature at the most equal to the mean temperature of stage (c), the variation between the mean temperature of stage (e) and the mean temperature of stage (c) being at the most equal to 20° C.

14. A process according to claim 1, wherein at least part of the cooling necessary for stage (b) is performed by indirect heat exchange between the gas from stage (a) and the gas from stage (e).

15. A process according to claim 1, wherein the regeneration of the solvent during stage (f) is carried out after expansion, in a contact column, by heating the bottom of said column in such a way as to reduce the acid gas concentration in said regenerated solvent phase, which is recycled to stage (g) and by cooling the top of said column, so as to reduce the solvent concentration of the eliminated acid gases.

16. A process according to claim 1, wherein the treated gas contains carbon dioxide and hydrogen sulphide and that the regeneration of the solvent during stage (f) is performed, after expansion, in a first contact column by heating the bottom of the said first contact column and by supplying to the top cf said first contact column a liquid solvent fraction, so as to at least partly absorb the hydrogen sulphide contained in the gaseous phase produced by expansion and heating, by discharging from said first contact column a gaseous fraction mainly formed by carbon dioxide and by supplying, following a further expansion, the solvent phase collected at the bottom of said first contact column to a second contact column, by heating the bottom of said second contact column. By discharging at the top of said second contact column a gaseous phase formed mainly by hydrogen sulphide and by removing from the bottom of said second contact column a regenerated solvent phase, which is recycled to stage (e).

17. A process according to claim 1, wherein stages (a) and (b) and/or (b) and (c) are performed in the same apparatus so that the contact operations between the gaseous phase and the liquid phase, as well as the heat exchange can be performed simultaneously.

18. An apparatus for the treatment of a gas containing methane, water, at least one hydrocarbon other than methane and at least one acid gas with a view to at least partly removing the water, hydrocarbons other than methane and acid gas, said apparatus comprising:

(a) contacting means in which the gas to be treated is contacted with a recycled liquid phase containing both water and a solvent, whereby a solvent-depleted, aqueous liquid phase, by comparison with recycled liquid phase, and a solvent-containing gaseous phase are obtained;

(b) means for cooling said gaseous phase from stage (a) so as to partly condense it and means for separating the resultant condensate, which contains an aqueous phase and a hydrocarbon phase, from non-condensed gas;

(c) means for rectifying said non-condensed gas of stage (b) comprising means for circulating said non-condensed gas in a rising direction, means for cooling it to induce partial condensation thereof, means for flowing resultant condensed liquid in a downward direction in countercurrent contact with rising gas, and collecting means for collecting, after said countercurrent contact, a non-condensed gaseous phase and a mixture of said condensed liquid phase with said condensate of stage (b), said mixture containing an aqueous liquid phase and a liquid hydrocarbon phase;

(d) means for separating said aqueous liquid phase from said liquid hydrocarbon phase obtained in step (c) by decanting, means for drawing off said liquid hydrocarbon phase, and means for recycling said aqueous liquid phase to stage (a);

(e) means for contacting said non-condensed gaseous phase from stage (c) with a regenerated solvent phase from stage (f), whereby at least part of the acid gas presence in said non-condensed gaseous phase is dissolved in said solvent phase, and means for collecting a deacidified gaseous phase and an acid gas-containing solvent phase; and (f) means for freeing by expansion and/or heating, at lest part of the acid gas from the solvent phase collected in stage (e) and means for returning resultant regenerated solvent phase to stage (e).

* * * * *

UNITED STATES PATENT AND TRADEMARK OFFICE
CERTIFICATE OF CORRECTION

PATENT NO. : 4,979,966

DATED : December 25, 1990

INVENTOR(S) : Rojey et al

It is certified that error appears in the above-identified patent and that said Letters Patent is hereby corrected as shown below:

Column 10, Claim 7, Line 63 & 64:

Read: "7. Process according to claim 1, characterized in that"

Should Read: --7. Process according to claim 1, wherein said solvent--

Signed and Sealed this

Seventh Day of July, 1992

Attest:

DOUGLAS B. COMER

*Attesting Officer*      *Acting Commissioner of Patents and Trademarks*